Dec. 6, 1960    H. J. BROWN    2,963,643
MAGNETIC CORE TESTER
Filed Oct. 20, 1958    3 Sheets-Sheet 1

INVENTOR.
HAROLD J. BROWN
BY
*H. H. Losche*
ATTORNEYS

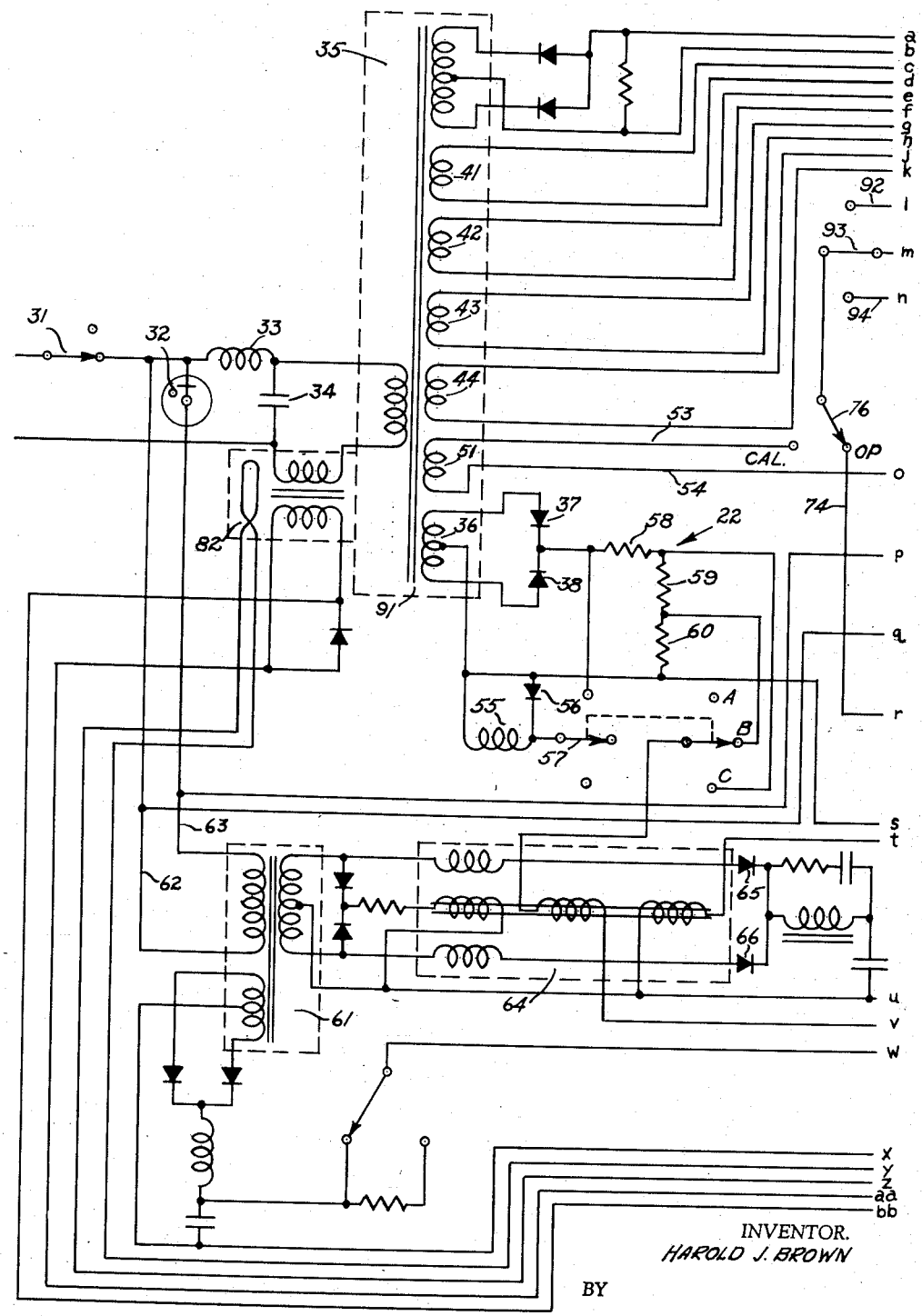

Dec. 6, 1960

H. J. BROWN 2,963,643

MAGNETIC CORE TESTER

Filed Oct. 20, 1958

INVENTOR.
HAROLD J. BROWN
BY
H. H. Losche
ATTORNEYS

United States Patent Office 2,963,643
Patented Dec. 6, 1960

2,963,643

MAGNETIC CORE TESTER

Harold J. Brown, 6947 College Ave., Indianapolis, Ind.

Filed Oct. 20, 1958, Ser. No. 768,501

6 Claims. (Cl. 324—34)

(Granted under Title 35, U.S. Code (1952), sec. 266)

The invention described herein may be manufactured and used by or for the Government of the United States of America for governmental purposes without the payment of any royalties thereon or therefor.

The present invention relates to a device for measuring toroidal cores and more particularly to a device for measuring significant properties of toroidal cores for the purpose of predicting their performance in magnetic amplifiers.

Heretofore various means have been employed to analyze toroidal cores in order to predict their behavior in magnetic amplifiers. One means was to compare the cores with a known standard core member and those within certain predetermined ranges of the known standard are acceptable for certain requirements. Another known means is to connect a vacuum tube voltmeter across the secondary of the core to be analyzed and obtain the peak-to-peak voltage output for computing in terms of permeability. Both these known means are very inaccurate, time consuming, and subject to considerable human error, and therefore considered as inadequate for the purpose of preparing core members for precision devices.

Another known method of analyzing cores is disclosed in U.S. Patent 2,805,390 which relates to an analyzer means that visually compares and measures the dynamic magnetic permeability and hysteresis properties of core members.

The present invention relates to a device for measuring core properties by a flux reset method for the purpose of predicting their performance in magnetic amplifiers. The flux reset method yields more direct information about a core than that which is determined from a hysteresis loop measurement in that it puts the core through a flux cycle more nearly related to the actual cycle of a magnetic amplifier. It is also fundamentally easier to measure the flux reset than to determine the parameters of a hysteresis loop. Also the measurements can be made more rapidly and more reliably.

In the present invention, the core that is to be tested is placed in a test fixture and is excited by a variable square wave magnetomotive force at a 400-cycle rate. At the end of the saturating half cycle, a relatively short pulse is applied to establish the initial condition for the measurement of reset. An amplifier and integrating rectifier translate the reset flux in the core into a voltage, which is compared to the reference voltage. The excitation source then adjusts itself to reset the desired flux. The necessary magnetomotive force to reset the flux to two values is usually read, as well as the difference between the maximum flux and remanent flux. An amplifier is calibrated by a constant average voltage square wave which is generated by a known magnetic core saturated by alternating current. As this signal is similar to the signal from a typical test core, the calibration of the amplifier is accurate and reliable.

It is therefore a general object of the present invention to provide an accurate means of measuring the properties of toroidal cores for the purpose of predicting their performance in magnetic amplifiers.

Another object of the present invention is to provide a relatively inexpensive device for matching toroidal cores that are to be used in pairs in magnetic amplifiers.

Other objects and many of the attendant advantages of this invention will be readily appreciated as the same becomes better understood by reference to the following detailed description when considered in connection with the accompanying drawings wherein:

Figures 3a and 3b illustrate a circuit diagram showing the components of one form of the invention.

Figure 1:
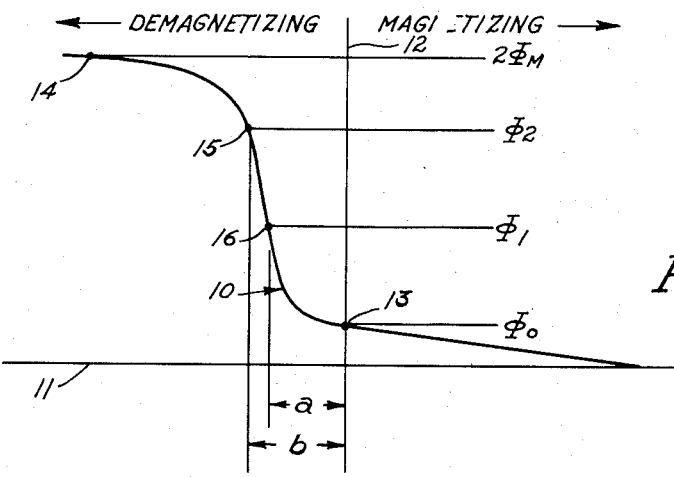
Figure 1 is a diagram of the control characteristics of a typical square loop, gapless, magnetic core used in many magnetic amplifiers.

Referring now to the drawings, in Figure 1 there is shown a curve 10 which illustrates the control characteristics of a typical magnetic core. The horizontal or "x" axis 11 is used to indicate magnetomotive force, which is preferably measured in ampere-turns. The vertical or "y" axis 12 indicates magnetic flux, preferably measured in maxwells. In operation, flux change results from the application of a demagnetizing magnetomotive force that is applied for a duration of time equal to one-half an alternating current cycle. The frequency of this applied alternating current corresponds to the frequency to which the core will be subjected in its magnetic amplifier application.

Referring still to Figure 1 of the drawings, the value of flux at full saturation is zero. Point 13 on curve 10, which is hereinafter referred to as $\Phi_0$, indicates the value of the flux existing when no demagnetizing magnetomotive force is being applied after full saturation. $\Phi_0$ is approximately equal to the difference between the flux at full saturation and the remanent flux.

Point 14 on curve 10 indicates the value of the magnetic flux when a very large direct current demagnetizing magnetomotive force is applied. This flux value is equal to twice the maximum flux carrying capacity of the core. Point 15 on curve 10, which is hereinafter referred to as $\Phi_2$, is usually three-fourths the nominal value of the value of the flux at point 14. Point 16, which is hereinafter referred to as $\Phi_1$, is preferably three-eighths of the same nominal flux value. a and b indicate, respectively, the value of the demagnetizing magnetomotive force necessary to generate the flux values $\Phi_1$ and $\Phi_2$. Cores having similar values of $\Phi_0$, a, and b are considered as matched for most purposes.

Figure 2:
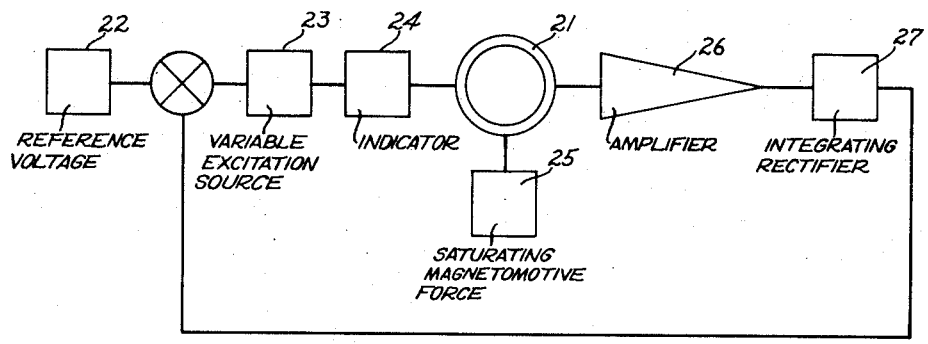
Figure 2 is a block diagram showing the main components of the present invention.

Referring now to Figure 2 of the drawings, which shows the present invention in block form, a brief description will be given first. The core 21 is excited by a variable square wave magnetomotive force 23 at a 400-cycle rate. The magnetomotive force is measured by an indicator 24 which gives the ampere-turn value of the demagnetizing magnetomotive force. At the end of the saturating half cycle from 23, a relatively short pulse is applied from 25 which establishes the necessary initial condition for the measurement of reset. The amplifier 26 and integrating rectifier 27 translate the reset flux in the core 21 into a voltage which is compared with the reference voltage 22. The excitation source 23 then adjusts itself to reset the desired flux. In practice, three values are read, namely, $\Phi_0$, and the magnetomotive forces necessary to cause the core to reset to the values, $\Phi_1$, and $\Phi_2$. The indicator 24 first indicates $\Phi_1$, a smaller value of 37.5 percent of the nominal flux range of the core. A switch 57 is then actuated and the indicator 24 causes the meter to read the value for $\Phi_2$, the value corresponding to 75 percent of the same nominal flux value. Switch 57 is then moved to a third position thereby causing relay 55 to be actuated so that $\Phi_0$ can be measured.

Figure 3B:
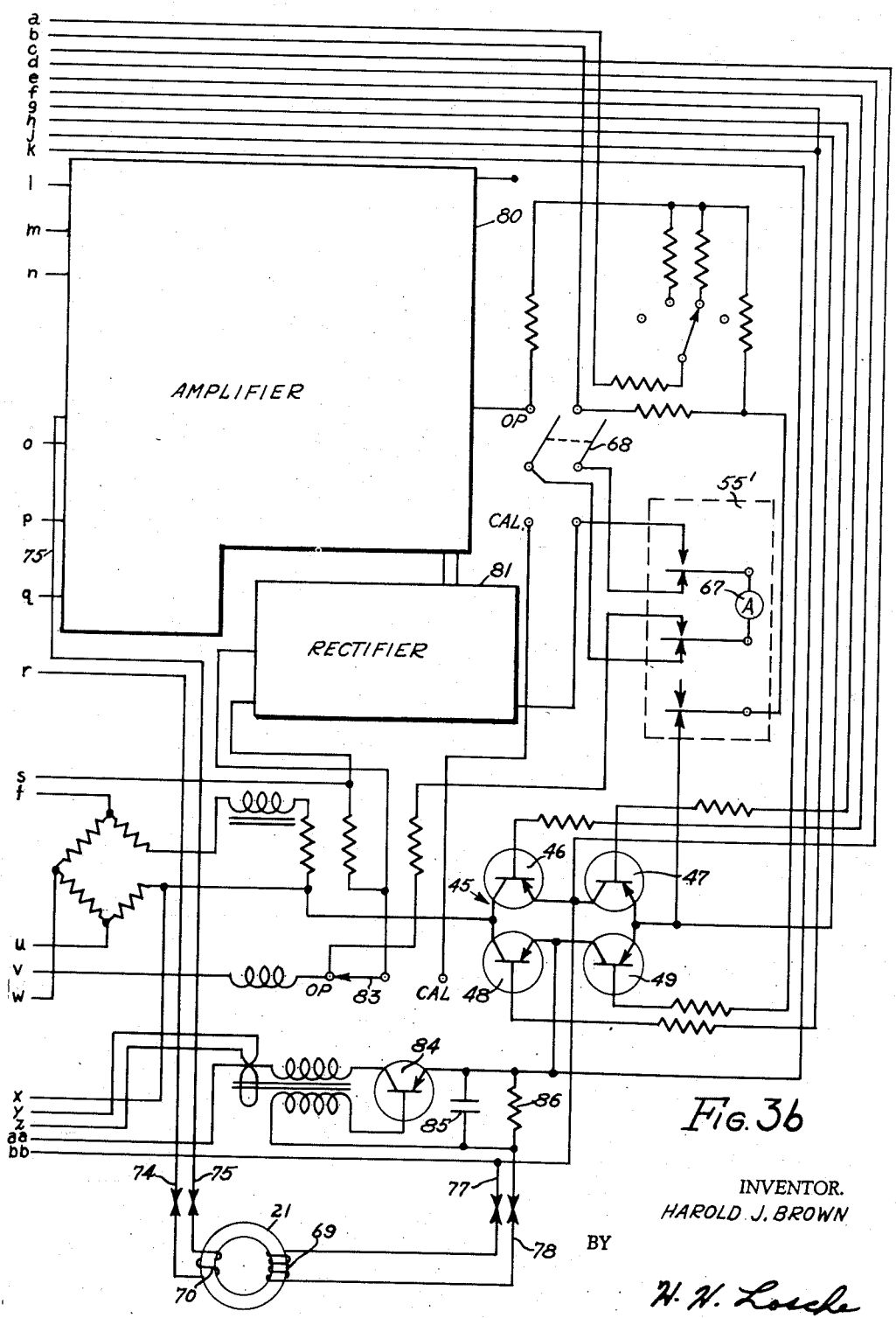

The invention will now be described in greater detail with reference to Figure 3 of the drawings. The test device is connected to a 115-volt, 400-cycle supply and has the customary on-off switch 31 and indicator light 32. The linear choke 33, capacitor 34, and saturable transformer 35 provide a square wave generator. The saturable transformer 35, which is illustrated as a toroidal transformer, has one winding 36 that is center-tapped and it is this winding along with rectifiers 37 and 38, resistors 58, 59, and 60, and the aforementioned choke and capacitor that provides the reference voltage 22 of Figure 3. Winding 41–44, inclusive, of transformer 35, provide the transistor base drive for a 400-cycle chopper 45, which includes transistors 46–49, inclusive. In addition, transformer 35 is provided with winding 51 which is used to supply a calibrating signal of constant average value. Winding 36, which is provided with a center-tap, also serves as the energy source for the constant voltage direct current reference source 22 and for relay 55. Switch 57 has three positions, two of which are used to provide voltages corresponding to either the $\Phi_1$ flux line or the $\Phi_2$ flux line. The third position of switch 57 is used to energize relay 55 for the purpose of measuring $\Phi_0$.

The variable square wave magnetomotive force, which is illustrated as item 23 in the block diagram of Figure 2, is provided by power transformer 61, which is connected to the 115-volt, 400-cycle supply, by leads 62 and 63, magnetic amplifier 64, and the silicon rectifiers 65 and 66. Ammeter 67 is connected to the output of this variable square wave magnetomotive force through relay contacts 55' and switch 68, which has a calibrating position and an operating position. Chopper 45 is also connected to this variable excitation source with the current going through the chopper and then through six (6) turns of coil 69 which encompass the toroidal core 21.

Amplifier 80, which can be a standard amplifier well-known in the art, amplifies either a calibrating signal that is supplied through leads 53 and 54 or a core flux signal that is generated by winding 70 of the core 21 under test and supplied through leads 74 and 75. Rectifier 81 rectifies the output of amplifier 80 and generates a direct current voltage proportional to the flux change of either the calibrating core 91 or the core 21 under measurement. Amplifier 80 has several inputs supplied, through either leads 92, 93, and 94, and corresponding to various gain levels. Each gain level is associated with a particular cross-section of core 21 being measured.

Magnetic amplifier 64 functions as a direct current source for chopper 45. The excitation thus furnished core 21 will automatically adjust itself to that value which will generate the desired flux response $\Phi_1$ and $\Phi_2$.

Figure 4:
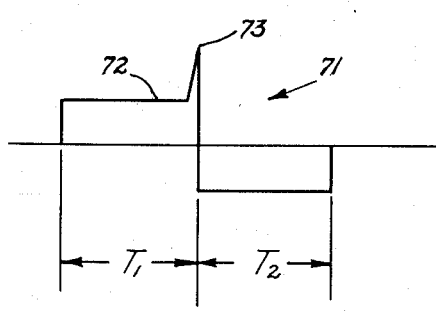
Figure 4 is a diagram showing an excitation current curve.

Referring now to Figure 4 of the drawings, there is shown a curve 71 of an excitation cycle that is applied to core 21. This excitation cycle consists of a square wave 72 and a short pulse 73, which is applied at the end of the magnetizing interval. The short pulse 73 is supplied by current transformer 82 through the transistor gate 84. The square wave source 72 is supplied by the variable direct current source 23 and comprises the power transformer 61, magnetic amplifier 64, rectifiers 65 and 66, and chopper 45. By providing this type of excitation current, the flux is set and reset at approximately the same rate. With good square loop material, the saturating pulse will produce very little signal since the flux is already near saturation level. This type of excitation cycle has a further advantage of effecting a tremendous reduction in the amount of power necessary to excite the core 21. Although the power cost in itself is not significant, the size and cost of the equipment can be reduced considerably over heretofore available equipment.

The flux reset of the core 21 is translated into a voltage by the amplifier 80 and the integrating rectifier 81. This voltage is compared with the reference voltage and the excitation source then adjusts itself to reset the desired flux. Magnetic amplifier 64 controls the direct current output that is applied to chopper 45. The control winding of magnetic amplifier 64 is connected between the reference voltage 22 and the output voltage of amplifier 80, the input voltage of which is generated by the flux response of the core 21 which is under measurement.

Upon actuation of relay 55, the meter portion of ammeter 67 is disconnected from its shunting resistors and the meter portion is connected as a voltmeter for measuring the output of amplifier 80. Upon actuation, relay 55 also disconnects the square wave excitation source 72. The pulse 73 then excites the core 21, thereby giving the flux response as a direct current meter indication.

In operation, amplifier 80 is first calibrated. Switches 68, 76 and 83 are placed in the "calibrating" position and switch 31 is closed. Switches 68, 76 and 83 could be separate switches, but the three are preferably combined in a 4-pole double-throw toggle switch. The gain control of amplifier 80 is adjusted to give the desired ouput voltage for the particular core 21 under measurement.

Switch 57 is next actuated to select a level corresponding to $\Phi_1$. Ammeter 67 will indicate the value of the magnetomotive force necessary to reset $\Phi_1$. Switch 57, which can be spring biased, is then actuated to select a reference level corresponding to $\Phi_2$ and the ammeter 67 will likewise indicate the value of the magnetomotive force necessary to reset $\Phi_2$. Ammeter 67 can be provided with a special scale in order that the magnetomotive force can be read directly in ampere-turns. The switch 57 is then actuated so that $\Phi_0$ can be determined in a like manner.

It can thus be seen that the present invention provides a rapid means of determining the physical properties of a toroidal core. It is believed that the construction and operation as well as the advantages of this improved core tester will be apparent from the foregoing detailed description thereof. It will also be apparent that while the invention has been shown and described in a preferred form, changes may be made in the circuits disclosed without departing from the spirit of the invention.

What is claimed is:

1. A magnetic core measuring device comprising: a detachable exciting core winding for attachment around a core to be measured; magnetic excitation means connected to said exciting core winding; a detachable pick-up winding for attachment around said core to be measured; and detection means connected to said pick-up winding for indicating the magnetomotive force necessary to reset the desired flux in the core to be measured; said magnetic excitation means having equal magnetomotive forces for setting and resetting magnetic flux and having saturating means at the end of the setting cycle.

2. A magnetic core measuring device comprising, a detachable exciting core winding for attachment around a core to be measured, a detachable pick-up winding for attachment around said core to be measured, a square wave generator connected to said exciting core winding for generating square wave excitation current for exciting said winding, means for applying a short current pulse at the end of the setting interval whereby the flux in the core to be measured is driven to saturation, amplifying and integrating means connected to said pick-up winding for translating flux of said core to be measured into a reset voltage, a reference voltage, means for comparing said reset voltage with said reference voltage and resetting the desired flux of the core to be measured, and means for indicating the ampere-turns necessary to reset the desired flux in the core to be measured.

3. A magnetic core measuring device comprising, a detachable exciting core winding for attachment around a core to be measured, a detachable pick-up winding for attachment around said core to be measured, a square wave generator connected to said exciting core winding for generating square wave excitation current for exciting said winding, means for applying a short current pulse at the end of the setting interval whereby the flux in the core to be measured is driven to saturation, amplifying and integrating means connected to said pick-up winding for translating flux of said core to be measured into a reset voltage, means switchable for calibrating said amplifying means, a reference voltage, means for comparing said reset voltage with said reference voltage and resetting the desired flux of the core to be measured, and means for indicating the ampere-turns necessary to reset the desired flux in the core to be measured.

4. A magnetic core measuring device as set forth in claim 3 wherein said means switchable for calibrating said amplifying means comprises a known magnetic core and a source of alternating current for saturating said known magnetic core whereby a constant average voltage square wave is generated.

5. A magnetic core measuring device comprising, a detachable exciting core winding for attachment around a core to be measured, a detachable pick-up winding for attachment around said core to be measured, magnetic excitation means connected to said exciting core winding and having equal magnetomotive forces for setting and resetting magnetic flux, said magnetic excitation means having flux saturation means at the end of the setting cycle, amplifying and integrating means connected to said pick-up winding for translating flux of said core to be measured into a reset voltage, means switchable for calibrating said amplifying means, a reference voltage, means for comparing said reset voltage with said reference voltage and resetting the desired flux of the core to be measured, and an ammeter connected in circuit with said magnetic excitation means for indicating the magnetomotive force necessary to reset the desired flux in the core to be measured.

6. A magnetic core measuring device as set forth in claim 5 wherein said means switchable for calibrating said amplifying means comprises a known magnetic core and a source of alternating current for saturating said known magnetic core whereby a constant average voltage square wave is generated.

References Cited in the file of this patent

UNITED STATES PATENTS

| | | |
|---|---|---|
| 2,805,390 | Patrick et al. | Sept. 3, 1957 |
| 2,830,262 | Lord | Apr. 8, 1958 |
| 2,888,641 | Lord | May 26, 1959 |

OTHER REFERENCES

"Electronics," article by Roberts and Hortsman, pp. 150–153, Aug. 1, 1957.